R. SAMPSON.
TIRE PLUG.
APPLICATION FILED MAR. 31, 1908.

923,896.

Patented June 8, 1909.

Witnesses:
Edward C. Rowland.
William H. Mohr.

Inventor,
Robert Sampson.
By his Attorney
Andrew Wilson.

UNITED STATES PATENT OFFICE.

ROBERT SAMPSON, OF MONTREAL, QUEBEC, CANADA.

TIRE-PLUG.

No. 923,896.  Specification of Letters Patent.  Patented June 8, 1909.

Application filed March 31, 1908. Serial No. 424,356.

*To all whom it may concern:*

Be it known that I, ROBERT SAMPSON, a subject of the Kingdom of Great Britain, residing at Montreal, Province of Quebec, and Dominion of Canada, have invented certain new and useful Improvements in Tire-Plugs, of which the following is a specification.

My invention relates to that class of tire plugs which consists primarily of two metallic members to be clamped respectively against the outer and inner sides of the tire by means of a screw threaded shank; and my improvements consist in the particulars hereinafter set forth.

Figure 1:
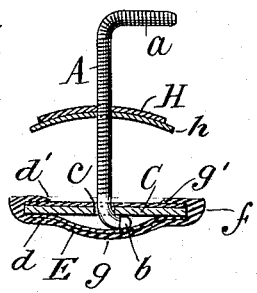
Figure 2:
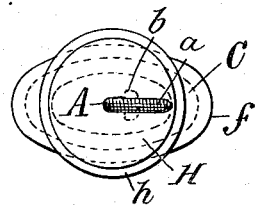
Figure 3:
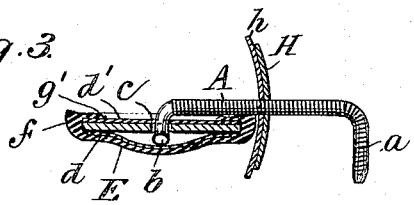
Figure 4:
Figure 5:
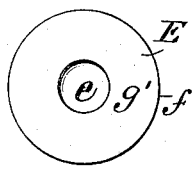
Figure 6:
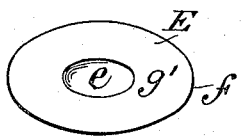

In the drawings Figure 1 is a vertical sectional view of one of my improved tire plugs, and Fig. 2 is a top view of the same; Fig. 3 is a sectional view which shows the shank bent over parallel with the head of the plug; Fig. 4 is a cross sectional view, and Fig. 5 is a top view of my improved rubber cap; and Fig. 6 is a top view of a modified form of cap.

Similar parts are designated by the same reference letters in all the figures.

A is a screw threaded shank having its upper end *a* bent over to form a finger hold and having its lower end bent to one side and terminating in a T head *b*.

C is a metallic head plate provided with a central opening *c*, through which the end of the shank A passes. On either side of this head plate I prefer to place coverings *d d'* of canvas, paper, sheet brass or similar material, the lower covering *d* being raised centrally so as to accommodate the head *b* of the shank A.

E is a rubber cap which is stretched over the head plate C. It is preferably of a mushroomed form, hollow, and has an opening *e*, through its back into its hollow interior. The rubber of which this cap is formed is made heavier around the edge *f*, and thinner and lighter toward the central portions *g g'*, so that, when it is stretched over the head plate C, the rubber will yield and the thickened edge portion *f* will be held firmly and evenly around the outer edge of the head plate C, without being dragged to either side thereof as would happen if the central portion of the cap were too heavy. It will be readily understood that, when the head of the plug is forced through a puncture, its edges will be subjected to more strain and wear than its central portions; and that therefore it is important that the rubber should be reinforced and firmly held around the periphery of the head plate.

H is a coöperating cap threaded upon the shank A; and *h* is a washer of canvas or other suitable material placed below the cap H.

It will be seen that when the head of the plug is swung parallel with the stem, as shown in Fig. 3, and then forced through a puncture in a tire, it may be secured in place by running down the cap H, and then rotating the shank A in the usual manner, the head *b* of the shank traveling between the under side of the head plate C and the covering *d* without abrading or injuring the rubber cap, the upper edge of the cap being firmly gripped between the top of the head plate C and the inner face of the tire, so as to form an air tight connection. The rubber cap thus effectually prevents the leakage of any air between the stem and the head plate C, and also prevents the cutting of the tire by the metal head plate C; while the coverings *d'* and *h*, when interposed between the members of the plug and the tire, will prevent abrading or corroding of the tire by direct contact with the metal cap or head plate, and will thus permit the use of steel instead of brass, if it is desired to use a cheaper metal.

I find it preferable to make the rubber cap circular, as shown in Figs. 4 and 5; because, in practice, I find that in pushing the head of the plug through a puncture the greatest stress is exerted on it longitudinally, with a consequent tendency to displace the cap lengthwise. But by making the cap circular and then stretching it over the elongated head plate, its strongest grip will be against the ends of the plate, and it will be thereby effectually held in position when being put through a puncture.

By making my plug in the manner described, I secure another novel feature in that the plug may be shipped or carried in stock in a knock-down state, and the parts assembled by unskilled labor when required for use, for it will be seen that the end *a* of the shank may be first passed through the opening *c* in the head plate C, the covering *d'* and the washer *h* and the cap H may be then placed upon the shank, the end *a* of the shank, if desired, not being bent over until the cap has been run on the shank, the face covering *d* may be then put in place, and the head cap E may be then stretched over the head plate C, completing the assembling of the parts of the plug ready for use. This is an important advantage, as it allows the parts of the plug to be packed closely together, facilitates sending them through the mail, and also permits the substitution of new parts if desired. And it is obvious that by reversing the steps above described the members of the plug may be again separated without injury.

Having thus described my invention what I claim and desire to secure by Letters Patent of the United States is:—

1. In a tire plug, the combination, with a metallic head-member of an elastic cap detachably attached thereto, and coöperating clamping mechanism.

2. In a tire-plug, the combination, with an elongated head-member of a circular, elastic cap detachably attached thereto, and coöperating clamping mechanism.

3. In a tire plug, the combination, with a head member, of a shank detachably attached thereto, a coöperating clamp detachably mounted upon said shank, and a detachable, elastic cap embracing said head member.

4. The combination, in a tire plug, of an inner head member, an elastic cap detachably embracing the same, an exterior clamping cap and a shank connecting the inner head and the clamping cap, all of said parts being adapted to be readily separated without injury thereto.

5. As a new article of manufacture, a head-cap for tire plugs consisting of a hollow, elastic body having an opening through one side into its hollow interior.

6. As a new article of manufacture, a head-cap for tire plugs consisting of a hollow, elastic body with relatively thickened edges and having an opening through one side into its hollow interior.

7. In a tire plug, the combination of a head having an opening therethrough, a shank passing through said opening and having an end, formed by bending the extremity of the shank to one side, slidably engaging behind said opening, and a clamp coöperating with said shank.

8. In a tire plug, the combination of a head having an opening therethrough, a shank passing through said opening and provided with an offset end, formed by bending the extremity of the shank to one side, rotatably and slidably engaging behind said opening, and a clamp coöperating with said shank.

9. In a tire plug, the combination of a metallic head member having an opening therethrough, a shank passing through said opening and provided with an end rotatably engaging behind the same, a flexible covering surrounding said metallic member and extending over the head of the shank, and a clamp coöperating with said shank.

ROBERT SAMPSON.

Witnesses:
 JAMES H. DAVISON,
 WILLIAM EWING.